US007463587B2

(12) United States Patent
Rajsic et al.

(10) Patent No.: US 7,463,587 B2
(45) Date of Patent: Dec. 9, 2008

(54) SYSTEM AND METHOD FOR IDENTIFYING PRE-COMPUTED PATHS IN A POLICY-BASED ROUTING NETWORK

(75) Inventors: Carl Rajsic, Nepean (CA); Maged Edward Shaker, Ottawa (CA)

(73) Assignee: Alcatel Lucent, Paris (FR)

( * ) Notice: Subject to any disclaimer, the term of this patent is extended or adjusted under 35 U.S.C. 154(b) by 627 days.

(21) Appl. No.: 11/032,023

(22) Filed: Jan. 11, 2005

(65) Prior Publication Data

US 2006/0153191 A1    Jul. 13, 2006

(51) Int. Cl.
*G01R 31/08* (2006.01)
(52) U.S. Cl. .................. 370/238; 370/230; 370/395.2; 709/238
(58) Field of Classification Search .................. None
See application file for complete search history.

(56) References Cited

U.S. PATENT DOCUMENTS

| | | | | |
|---|---|---|---|---|
| 5,933,425 A * | 8/1999 | Iwata | .................. | 370/351 |
| 6,370,119 B1 * | 4/2002 | Basso et al. | .................. | 370/252 |
| 6,542,469 B1 * | 4/2003 | Kelley et al. | ................ | 370/238 |
| 6,804,199 B1 * | 10/2004 | Kelly et al. | .................. | 370/238 |
| 6,981,055 B1 * | 12/2005 | Ahuja et al. | ................ | 709/238 |
| 7,330,436 B2 * | 2/2008 | Fabre et al. | .............. | 370/238.1 |
| 2004/0081135 A1 * | 4/2004 | Ewing et al. | ................ | 370/351 |
| 2004/0088431 A1 * | 5/2004 | Carter | ........................ | 709/240 |

OTHER PUBLICATIONS

Private Network-Network Interface Specification Version 1.1, The ATM Forum Technical Committee, Apr. 2002.
Policy Routing Version 1.0, The ATM Forum, Technical Committee, Apr. 2003.

* cited by examiner

*Primary Examiner*—Bob A Phunkulh

(57) ABSTRACT

The invention provides a system and method for identifying a pre-computed path for an incoming connection at a node in a policy-based routing network. The method comprises: examining requirements of the incoming connection; examining policies associated with routes available from the node; identifying at least one policy of the policies which meets the requirements of the incoming connection; and utilizing that one policy for the pre-computed path for the incoming connection.

6 Claims, 2 Drawing Sheets

SYSTEM AND METHOD FOR IDENTIFYING PRE-COMPUTED PATHS IN A POLICY-BASED ROUTING NETWORK

FIELD OF THE INVENTION

The present invention relates generally to the field of communications networks and more particularly, to a method and apparatus for identifying one or more pre-computed paths in a policy-based routing network. By way of example, the invention may be especially adapted to source routed networks, such as those operating according to Asynchronous Transfer Mode (ATM) or Multiple Protocol Label Switching (MPLS) protocols.

BACKGROUND OF THE INVENTION

In a communication network, source-based routing provide a system and method for computing paths to be taken for connection requests as they route through nodes in the network. Typically in a source-routing protocol the source node computes an optimum path that a certain connection request should take throughout the network to reach its destination to reach its destination. The path is computed based on the source node's view of the network topology and the connection request requirements (e.g. bandwidth, class of service, etc.). The computation is performed such that the resulting path satisfies and complies to the connection request requirements. Once the full path is computed, it is included in the connection request's signaled message and the connection request is launched through the network, traversing the nodes that are indicated in the computed path. Each node, that receives the connection request, strictly follows the signaled path, and forwards the connection request to the next node as indicated in the given path. This is contrasted against a hop-by-hop protocol, where the next link that is chosen is decided by each successive node in the dynamically selected path. It will be appreciated that the terms "call" and "connection request" in this environment may be used interchangeably, although the term "connection request" has a more generic meaning, as it can also relate to ATM, IP and other connections for different network architectures.

Further, policy routing is utilized in the art of communications networks in order to control the manner in which network traffic or its related network connections are routed across a routing domain of the network. As such, paths can be assigned to have specific bandwidth and quality of service (QoS) parameters.

In an ATM network, the ATM Forum's Private Network-to-Network Interface (PNNI) provides a source-routing protocol for ATM transmissions. As a routing protocol, PNNI allows switches in the network to determine the best route to establish a connection.

One known routing and signaling specification for the support of policy routing is that provided by the specification of The ATM Forum Technical Committee entitled "Policy Routing", version 1.0, which is dated April 2003 and is identified as document number af-cs-0195.000 (the "Policy Routing Specification"), the contents of which are hereby incorporated by reference. The Policy Routing Specification is an addendum to existing signaling specifications of The ATM Forum Technical Committee, namely: "ATM User-Network Interface (UNI) Signaling Specification", version 4.1, which is dated April 2002 and is identified as document number af-sig-0061.002; "ATM Inter-Network Interface Specification", version 1.1, which is dated September 2002 and is identified as document number af-cs-0125.002; and "Private Network-Network Interface Specification, version 1.1, which is dated April 2002 and is identified as document number af-pnni-0055.002, all as known to those skilled in the art of communications networks.

In typical policy routing mechanisms, and as described in the Policy Routing Specification, Network Elements ("Ne") or Resource Partitions ("Rp") may be identified and advertised throughout the network topology for purposes of routing traffic through the network in question. For instance, a network element may be a link or the entirety of a trunk group, whereas a resource partition may be a bandwidth partition of such a trunk group. In forwarding a traffic stream, a policy based request for forwarding may be made, wherein the request may describe a forwarding constraint to either (i) prescribe the avoidance or requirement of one or more particular network elements or (ii) prescribe the requirement of one or more particular resource partitions. Such a policy based request may be communicated by way of the forwarding constraint, such as a policy constraint, being assigned to a connection and signaled during the establishment of same. A node which is initiating the establishment of the network path for a traffic stream will use the advertised network elements and resource partitions together with the signaled policy constraint to compute or otherwise establish a network path that satisfies the constraint in question.

Policy routing capabilities may be used in communications networks to provide varying services based on different network utilization strategies. For instance, policy routing may be deployed in the provisioning of Virtual Backbone Networks ("VBN"), in the selection or avoidance of network paths associated with a predetermined link quality, in the routing of connections utilizing multiple ordered policy constraints, in the specification and use of bare network resources for inter-network core networks, in bandwidth partitioning between SVC and SPVC connections, and in the dynamic allocation of network bandwidth among identifiable categories of connections. However, in such policy-based systems, it has not been known to provide a system and method for identifying suitable pre-computed paths for connections when they reach a node in such a network.

SUMMARY OF THE INVENTION

In a first aspect, a method for identifying a pre-computed path for an incoming connection at a node in a policy-based routing network is provided. The method comprises: examining requirements of the incoming connection; examining policies associated with routes available from the node; identifying at least one policy of the policies which meets the requirements of the incoming connection; and utilizing the one policy for the pre-computed path for the incoming connection.

In the method, examining the requirements of the incoming connection may comprise distilling the requirements into one or more connection elements. Also, examining the policies associated with routes available from the node comprises distilling the policies into one or more policy elements. Also, identifying the at least one policy comprises comparing one or more connection elements against one or more policy elements.

In the method, the requirements of the incoming connection may comprise required policy elements and must-avoid elements.

In the method, identifying at least one policy may comprise: first identifying routes that have a lowest number mismatching required elements compared with required elements of the incoming connection as a first set; then from the first set, identifying routes that have a highest number of required elements matching required elements the incoming connection as a second set; and then from the second set, identifying a route having a lowest number of must-avoid elements that mismatch with must-avoid elements of the incoming connection as the one policy.

In the method, the policy-based routing network may be an ATM network and the node may be an ATM network device.

In the method the policy-based routing network may be based on PNNI protocols.

In a second aspect, a system for identifying a pre-computed path for an incoming connection at a node in a policy-based routing network is provided. The system comprises four modules. The first module examines requirements of the incoming connection. The second module examines policies associated with routes available from the node. The third module identifies at least one policy of the policies which meets the requirements of the incoming connection. The fourth module sets an egress route for the incoming connection utilizing the policy for the pre-computed path.

In the system, the first module may distill the requirements into one or more connection elements. Further, the second module may distill the policies into one or more policy elements. Further still, the third module may compare the connection elements against the policy elements.

In the system, the requirements of the incoming connection may comprise required policy elements and must-avoid elements.

In the system, the third module may first identify routes that have a lowest number mismatching required elements compared with required elements of the incoming connection as a first set. Then it may take the first set and identify routes that have a highest number of required elements matching required elements the incoming connection as a second set. Then from the second set, it may identify a route having a lowest number of must-avoid elements that mismatch with must-avoid elements of the incoming connection as the one policy.

In the system, the policy-based routing network may be an ATM network and the node may be an ATM network device.

In the system, the policy-based routing network may be based on PNNI protocols.

In other aspects various combinations of the above aspects may be provided.

BRIEF DESCRIPTION OF THE DRAWINGS

By way of illustration and not of limitation, embodiments of the present invention are next described with reference to the following drawings, in which.

DETAILED DESCRIPTION OF EMBODIMENTS

In the embodiment, a system and method for pre-computing paths for a policy-based connection is provided. Routing policy-based connections, such as policy-based SVC or SPVC connections, typically requires more time to route than non-policy based connections. The additional time is usually due to computational overhead in checking links in the computed path for compliance with the policy associated with the connection. To reduce call establishment latencies, the invention provides a system and method for identifying suitable pre-computed paths for policy-based connections. These pre-computed paths are used by the source routing node that receives the policy based connection to immediately route the connection in the network without further path computations.

Figure 1:
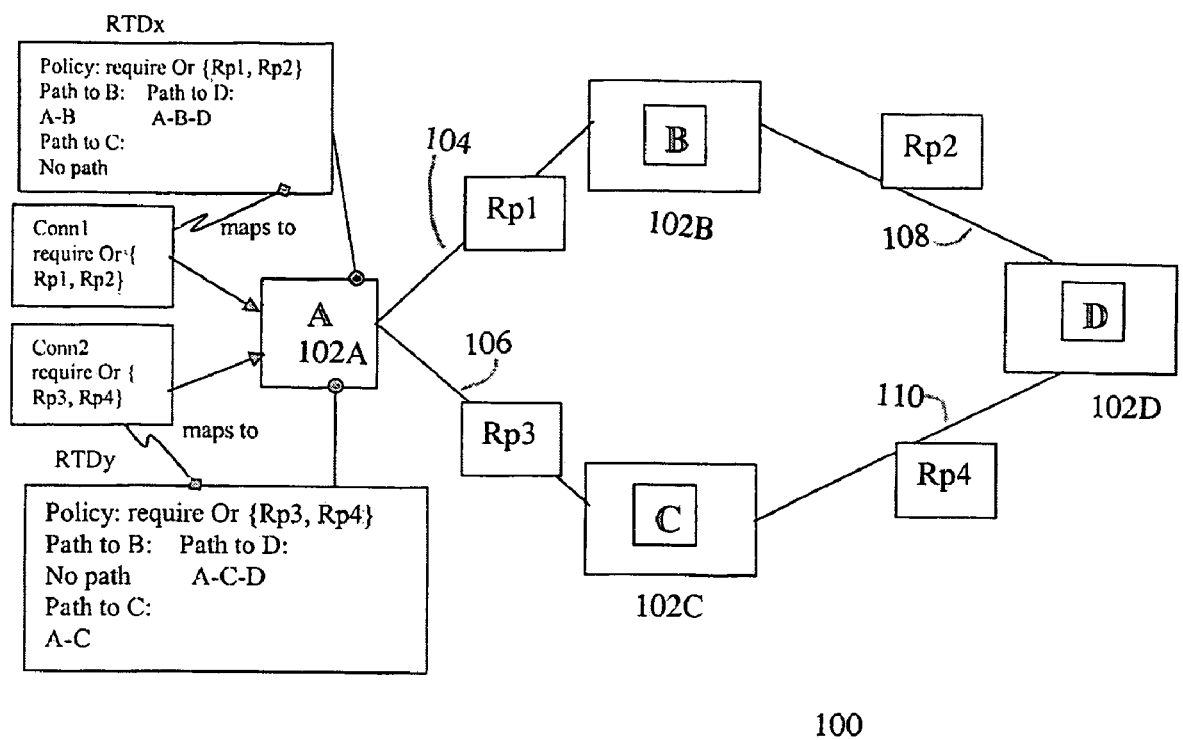
FIG. 1 is a block diagram of a communication network and its elements providing an embodiment of the invention and background relating to establishment of policy based connections.

Turning to FIG. 1, network 100 is provided which illustrates an example of a network in which nodes perform path computation for each policy based connection traversing them. In particular, network 100 is provided with nodes A, B, C and D indicated at 102A, 102B, 102C and 102D respectively. Node A is connected to node B through link 104 and to node C through link 106; node B is connected to node D through link 108; and node C is connected to node D through link 110. At node A, two connection requests are received, Conn1 and Conn2. Conn1 has a requirement that it uses either link 104 (Rp1) or link 108 (Rp2). Conn2 has a requirement that it uses either link 106 (Rp3) or link 110 (Rp4). Node A will compute appropriate paths for Conn1 and Conn2 using routing table descriptors (RTDs) to generate appropriate routing tables containing pre-computed paths that satisfy the requirements of the different connections traversing the network. Each RTD contains one or more parameters defining the characteristics of the connections that can use the pre-computed paths in the respective routing table. When a connection arrives at a node in a communication network, the parameters of the connection are examined to identify a routing table which may be used for the connection at the node. The parameters may include such characteristics as service quality, minimum required bandwidth and a policy constraint for the connection.

When a connection request is received at the node, the embodiment attempts to map the connection request to an appropriate RTD based on the connection requirements. Upon identifying an appropriate mapping, the pre-computed path represented by the appropriate RTD is used to route the connection request. In the processing of identifying an appropriate mapping, the selected pre-computed path is chosen such that it is the path which satisfies as much as possible the connection requirements, thereby tending to minimize the possibility of blocking of the connection during its establishment in the network.

Figure 2:
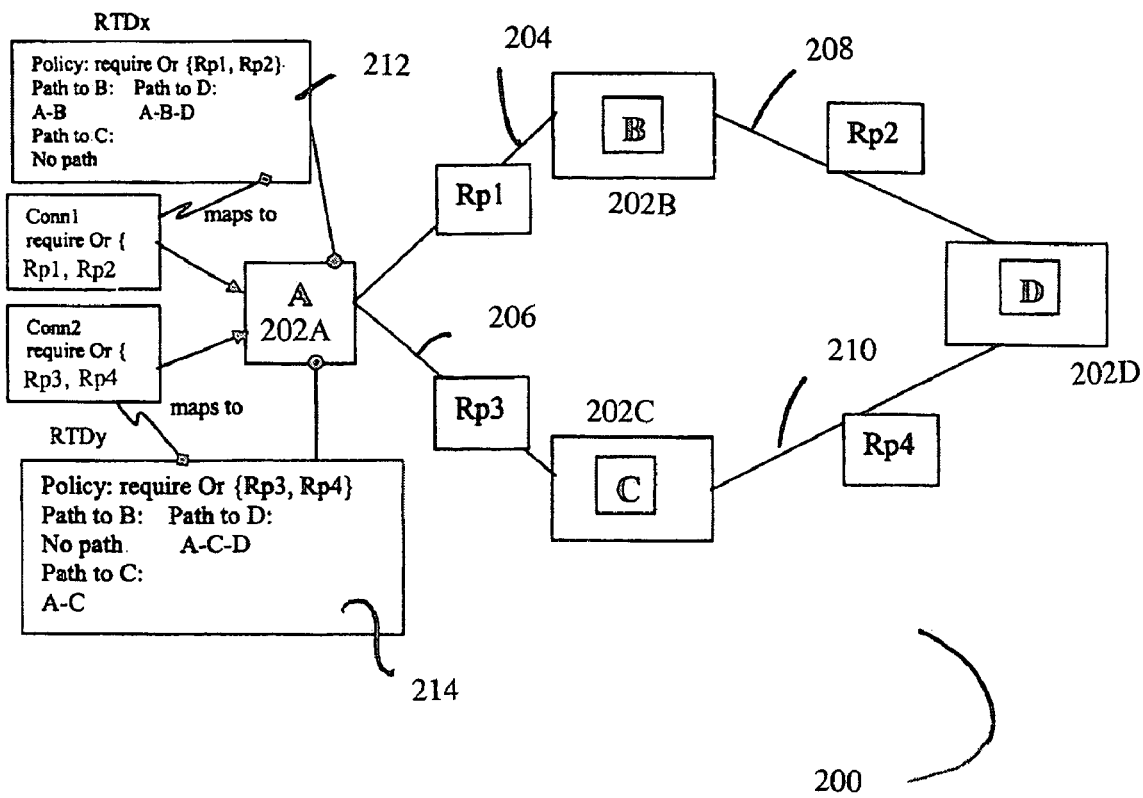
FIG. 2 is a block diagram of another communication network and its elements providing an embodiment of the invention.

Referring to FIG. 2, further detail is shown regarding RTDs and their use in a network. In particular, network 200 is provided with nodes A, B, C and D indicated at 202A, 202B, 202C and 202D respectively. Node A is connected to node B through link 204 and to node C through link 206; node B is connected to node D through link 208; and node C is connected to node D through link 210.

As an example, two connection requests are received at node A. The first connection, Conn1, is destined to node D, and has a requirement that it be routed on a path that contains network resources or elements tagged with Rp3 or Rp4. The second connection, Conn2, is also destined to node D and has a requirement that it be routed on a path that contains network resources or elements tagged with Rp1 and Rp2. Further detail on Rps is provided below. Node A has two configured RTDs; namely, RTD x (212) and RTD y (214). Each RTD is configured with a specific policy, and node A uses this policy to pre-compute paths to different nodes in the network (e.g. node C, node D). Also, when node A receives Conn1 and Conn2 it maps the connection requests to their respective RTD. As such, Conn1 will map to RTD y and Conn2 will map to RTD x. Based on this mapping, Conn1 will use the pre-computed path defined in RTD y to node D which is A-C-D. Likewise, Conn2 will use the precomputed path in RTDx to node D which is A-B-D. The RTD policy is used to prune the network while pre-computing paths within that network for the RTD. The network is pruned such that it contains paths that satisfy the RPEs and avoid the APEs of the RTD policy.

Mapping a connection request's policy to an RTD policy is the process of finding an RTD with a policy that closely represents the same pruned network that the connection request's policy represents. This means that the policy pruning elements in both the connection request's policy and RTD policy should be as similar as possible. Preferably, the RTD that has identical policy elements to those of the connection request is the best RTD to be mapped to by the connection request. However, in the absence of such an RTD, other RTDs with policies that have some variations from the connection request's policy may also be considered as candidate RTDs for the connection request. RTD policies may be slightly or extremely different from the connection request's policy, yet possess some pruned network similarities, that could render them appropriate for the connection request. Thus, an RTD is considered a candidate if its policy provides a pruned network representation that is preferably as close as possible to the connection request's policy representation. While this candidate RTD may not definitively guarantee that the pre-computed path for the connection request's destination will match the connection request's policy requirements, it does increase the likelihood of finding an appropriate pre-computed path.

In the process of mapping a policy based connection to an RTD, the connection signaled policy in the connection request and the RTD policy components are both expanded into their basic elements. In the embodiment, there are two basic elements in a policy, namely, a required policy element (RPE) and an avoided policy element (APE). An RPE represents a logical combination of required resources that must be made available on the path of the connection. An APE represents a logical combination of resources that must be avoided on the path of the connection. Further detail on expanding policy requirements (as RPEs) and restrictions (as APEs) are provided below.

If the policy in question complies with the Policy Routing Specification, the signaled policy elements of the signaled policy are first derived by a process of logical expansion as described more fully below.

The general format of a policy, as known to those skilled in this art, may be represented as follows:

Policy::={[require (logical_or|logical_and {Ne-NSC_list}; logical_or|logical_and {Rp-NSC_list}); must-avoid (logical_or|logical_and {Ne-NSC_list})]}  (1)

where: {Ne-NSC list} is a list of NSC policy routing tags pertaining to network elements;
  {Rp-NSC list} is a list of NSC policy routing tags pertaining to resource partitions;
  "require" denotes a component of the policy which is a requirement for routing a connection request or connection associated with the policy (1);
  "must-avoid" denotes a component of the policy which is required to be avoided for routing the connection request or connection associated with the policy (1); and
  "logical_or" and "logical_and" are alternative operands that respectively denote whether the immediately ensuing constituent policy routing tags of the lists {Ne-NSC list} or {Rp-NSC list} are to be either logically or'd or logically and'd, as the case may be. It is also possible for either or both of the lists {Ne-NSC list} and {Rp-NSC list} to contain a single policy routing tag, in which case the operands "logical_or" and "logical_and" will not be used on such individual items. Moreover, in the Policy Routing Specification, each of the "require" items of the policy (1) are to be interpreted as being logically and'd in relation to one another. These "require" items are the constituent parts of the "require" component of the policy (1) as next explained.

The "require" component of the policy (1), namely the component consisting of:

logical_or|logical_and {Ne-NSC list}; logical_or|logical_and {Rp-NSC list}  (2)

and represents an expression of an RPE. The "require" component can further be divided into smaller elements in the nature of required policy elements. To provide a simple example of the aforementioned expansion of the require component (2), a policy defined as:

[require (logical_or {$Ne_1, Ne_2$})]  (3)

can be expanded into the required policy elements ($Ne_1$) and ($Ne_2$), each of which are logically or'd in relation to the other. Likewise, a policy defined as:

[require (logical_and {$Ne_1, Ne_2$})]  (4)

can be expanded into the single required policy element ($Ne_1$ & $Ne_2$).

Where more than one list of NSC policy routing tags is found in a require component (2), the require component (2) can be expanded by the logical multiplication of the lists {Ne-NSC list} and {Rp-NSC list}, with each resulting required policy element being logically or'd in relation to one another. By way of example, a policy defined as:

[require (logical_or {$Ne_1, Ne_2$}; logical_and {$Rp_1, Rp_2$})]  (5)

can be expanded into two required policy elements, namely ($Ne_1$ & $Rp_1$ & $Rp_2$) and ($Ne_2$ & $Rp_1$ & $Rp_2$), with these two required policy elements being logically or'd in relation to one another. By way of further example, a policy defined as:

[require (logical_or {$Ne_1, Ne_2$}; logical_or {$Rp_1, Rp_2$})]  (10)

can be expanded into four required policy elements, namely ($Ne_1$ & $Rp_1$), ($Ne_1$ & $Rp_2$), ($Ne2$ & $Rp_1$) and ($Ne_2$ & $Rp_2$), with these four required policy elements being logically or'd in relation to one another.

A similar analysis as outlined above may be utilized to expand the "avoid" component of the policy (1), which represents an expression of an APE. In the example, the "avoid" component consists of:

[must-avoid (logical_or|logical_and {Ne-NSC_list}]  (11)

It will be appreciated that the expansion of the policy elements utilizes Boolean algebra to expand and distil each expression to their elements, including utilization of DeMorgan's theorem. It will be appreciated that for some expressions, it may not be necessary to distil them to their ultimate atomic elements. In other embodiments, Boolean NOT and XOR functions may be applied, as appropriate. It will also be appreciated that one or more equivalent expressions can be generated from the original expression. Also, in other embodiments, the required policy and must-avoid expressions may be first combined together, either in whole or in part, and then the resulting expression is partially or entirely distilled to its components. All of these functions can be expressed in an appropriate function in software.

Once the connection request and RTD policies (5) have been expanded as aforesaid into their respective constituent required policy elements (RPEs), and avoided policy elements (APEs), the connection policy elements are compared against the RTD policy elements to determine if the RTD policy satisfies the connection policy requirements, as described below.

For a connection request to map to an RTD, none of the connection policy APEs should match any of the RPEs in the RTD. This would ensure that none of the pre-computed paths in the RTD contain links that the connection must avoid. Also, for the connection, at least one of its RPEs needs to match an RPE of an RTD. This would ensure that at least one pre-computed path of the RTD will utilize links required by the connection.

In one embodiment, the following two general rules are used to match requirements of RPEs and APEs of a connection to the RTDs of the node.

A connection request APE matches an RTD RPE, if the NSCs in the RTD RPE are equal to or contain the NSCs in the connection request APE. Generally, the order of the NSCs in the RPE and APE is not significant, however, the number of NSCs that matches is used to further refine the RTD selection, as noted below.

For a match to occur between a connection request RPE and an RTD RPE, the NCSs in the RTD RPE must be equal to or contain the NSCs in the connection request RPE. Generally, the order of the elements in the RPE is not significant, however, the number of NSCs that matches is used to further refine the RTD selection, as noted below.

Table 1 provides a few examples of matching and mismatching connection request APEs and RTD RPEs.

TABLE 1

Matching RTD RPEs to Connection request APEs

| RTD RPE | Connection request APE | RPE-APE Match? | Remarks |
| --- | --- | --- | --- |
| $(Ne_1\&Ne_2\&Rp_1)$ | $(Ne_1\&Ne_2)$ | Yes - not candidate for mapping. | The RTD RPE shows that the pre-computed path will contain links that are tagged with both $Ne_1$ and $Ne_2$ NSCs, which is the combination that is being avoided by the connection request. |
| $(Ne_2\&Rp_1)$ | $(Ne_1\&Ne_2\&Ne_3)$ | No - a candidate for mapping. | The RTD RPE indicates that the links in the pre-computed path may not be tagged by the NSC combination $(Ne_1\&Ne_2\&Ne_3)$ being avoided by the connection request. |
| $(Ne_2\&Ne_1)$ | $(Ne_1\&Ne_2)$ | Yes - not candidate for mapping. | The RTD RPE and connection request APE are equal. |

Table 2 provides some examples of matching and mismatching RPEs.

TABLE 2

Matching RTD RPEs to Connection request RPEs

| RTD RPE | Connection request RPE | RPE-RPE Match? | Remarks |
| --- | --- | --- | --- |
| $(Ne_1\&Rp_1\&Rp_2)$ | $(Ne_1\&Rp_2)$ | Yes - a candidate for mapping. | The RTD RPE indicates that the pre-computed path must contain links that are tagged with the combination of $Ne_1$ and $Rp_2$ NSCs that are required by the connection request. |
| $(Rp_1)$ | $(Ne_1\&Ne_2)$ | No—not a candidate for mapping. | The RTD RPE shows that the pre-computed path does not contain the NSC combination $Ne_1\&Ne_2$ that is required by the connection request. |
| $(Ne_2\&Ne_3)$ | $(Ne_3)$ | Yes - a candidate for mapping. | The RTD RPE indicates that the pre-computed path must contain links that are tagged with the $Ne_3$ NSC, which is what the connection request requires. |
| $(Ne_3)$ | $(Ne_3)$ | Yes - a candidate for mapping. | Both RPEs are equal. |

It is notable that there are varying degrees of matching. For instance, while both entries in rows 3 and 4 are matching cases, the match in row 4 is the closest match.

It is notable that, based on the above connection request to RTD mapping rules, a connection request with a must-avoid component may still map to an RTD, even though the connection request APEs mismatch with the RTD APEs. This can be acceptable because some connection requests may try to avoid link types that are not available in the network in which the RTD is defined. Accordingly, the RTD cannot contain a policy that avoids these types of links. Consequently, a connection request with a must-avoid component may also map to an RTD with a policy that has no must-avoid component, and vice versa, provided that the above mapping rules are satisfied.

A special case of the above noted condition is that if a connection request does not contain any RPEs and if the RTD has no RPEs (i.e. connection request/RTD policy has no require component), that RTD can also be considered to be a match.

Two examples are now provided where a connection request having a defined policy is mapped to various existing RTDs at a node.

EXAMPLE 1

Consider a connection request that has a policy defined as:

[require (logical_or (Rp-NSC_1, Rp-NSC_2})]

The policy translates into:

RPE1: (Rp-NSC_1) or

RPE2: (Rp-NSC_2)

Table 3 provides a mapping of the connection request policy against several RTDs, numbered 2 to 5.

TABLE 3

Matching a Connection request's Policy against a number of RTDs of a node

| RTD Policy | Map? | Remarks |
| --- | --- | --- |
| RTD 2<br>[require (logical_or<br>{Rp-NSC_1, Rp-NSC_3});<br>must-avoid (single<br>{Ne-NSC-1})]<br>which translates into:<br>(Rp-NSC_1) or<br>(Rp-NSC_3)<br>(Ne-NSC_1) | Yes | Connection request RPE1 matches RTD RPE1. This indicates that the path represented by that RTD may contain links that are tagged with Rp-NSC_1 which is required by the connection request. |
| RTD 3<br>[require (logical or<br>{Ne-NSC_3, Ne-NSC_4});<br>must-avoid (single<br>{Ne-NSC-1})]<br>which translates into:<br>(Ne-NSC_3) or<br>(Ne-NSC_4):<br>(Ne-NSC_1) | No | None of the RTD and connection request RPEs match. |
| RTD 4<br>[must-avoid (single<br>{Ne-NSC-1})]which<br>translates into:<br>(Ne-NSC_1) | No | None of the RTD and connection request RPEs match. RTD actually has no RPEs. |
| RTD 5<br>[require (logical_or<br>{Rp-NSC_1, Rp-NSC_2});<br>must-avoid (single<br>{Ne-NSC-1})]<br>which translates into:<br>(Rp-NSC_1) or<br>(Rp-NSC_3)<br>(Ne-NSC_1) | Yes | The connection request and RTD RPEs have an exact match. Thus, the RTD path is guaranteed to contain links that will satisfy the connection request RPEs. |

EXAMPLE 2

If a connection request that has a policy defined as:

[must-avoid (logical_or {Ne-NSC_1, Ne-NSC_2})]

which translates into:

APE1: (Ne-NSC_1) or

APE2: (Ne-NSC_2)

Table 4 provides a mapping of the connection request policy against several RTDs, numbered 2 to 4.

TABLE 4

Matching a Connection request's Policy against a number of RTDs of a node

| RTD Policy | Map? | Remarks |
| --- | --- | --- |
| RTD 2<br>[require (logical_or<br>(Ne-NSC_3,<br>Ne-NSC_4});<br>must-avoid (single<br>{Ne-NSC-1})]<br>which translates into:<br>(Ne-NSC_3) or<br>(Ne-NSC_4)<br>(Ne-NSC_1) | No | RTD and connection request RPEs do not match. Connection request has no RPEs; while RTD has 2 RPEs. |
| RTD 3<br>[must-avoid (single<br>{Ne-NSC-5})]<br>which translates into:<br>(Ne-NSC_5) | Yes | RTD and connection request RPEs match. Both have no RPEs. Although the connection request maps to this RTD, it might not be the best RTD to use since it does not fulfill the connection request's APE requirements. |
| RTD 4<br>[require (logical_or<br>{Ne-NSC_2,<br>Ne-NSC_3})]<br>which translates into:<br>(Ne-NSC_2) or<br>(Ne-NSC_3) | No | Connection request APE2 matches RTD RPE1. This indicates that the path represented by that RTD may contain links that are tagged with Ne-NSC_2 which is being avoided by the connection request. |

As illustrated in examples 1 and 2, policies of a connection request may map to several RTDs, with varying policy definitions. Each mapping may provide different levels of guarantee that the pre-computed path of the RTD satisfies the policy requirements of the connection request. It is necessary to select the most appropriate RTD amongst the mapped RTDs.

For the embodiment, the most appropriate RTD selected from among the ones that the connection request mapped to, is the one that has a policy that provides the highest guarantee that the pre-computed path fully satisfies the connection's policy requirements. Clearly, an RTD with a policy identical to the connection's policy provides the highest guarantee, and consequently is selected. In the absence of such an RTD, the next RTD that provides the highest guarantee should be selected. Selecting such an RTD, will most probably increase the likelihood of successful establishment of the connection, thus avoiding the need to resort to actual path computation during the connection establishment which can introduce high connection processing latencies. As such, when a policy based connection maps to multiple RTDs, the embodiment provides a selection algorithm to identify the most appropriate RTD for the connection based on their policy matching. Further detail on the algorithm is provided below.

To select the most appropriate RTD from the set of RTDs that the connection request mapped to, in one algorithm, the policy elements (APE, and RPEs) of the RTDs policies are compared to those of the connection request's policy to determine the number of matching and mismatching elements. Based on these numbers, the RTDs in the set are filtered using the following rules in the preferred order shown, to select the most appropriate RTD.

Rule (a) From the set of RTDs that the connection request mapped to, the RTDs that have the highest number of APEs that match the connection request APEs are selected.

Rule (b) From the set of RTDs selected in (a), the RTDs that have the lowest number of RPEs that mismatch with the connection request RPEs are selected.

Rule (c) From the set of RTDs selected in (b), the RTDs that have the highest number of RPEs with that match the connection request RPEs are selected.

Rule (d) From the set of RTDs selected in (c), the RTDs that have the lowest number of APEs that mismatch with the connection request APEs are selected.

Rule (e) From the set of RTDs selected in (d), the RTDs that have the APEs with the closest match with the connection request APEs are selected.

Rule (f) From the set of RTDs selected in (e), the RTDs that have the RPEs with the closest match with the connection request RPEs are selected.

The above rules provide a method that measures the degree of guarantee that the RTD policy offers with regards to the connection request's policy requirements. In particular:

Rule (a): This rule filters out all the RTDs that may contain paths that violate the connection request's policy requirements. It is preferable to filter RTDs based on this rule first, because if the RTD's pre-computed path contains all the NSCs required in the connection request's policy, yet it still contains other NSCs that are being avoided by the connection request's policy, the connection request will eventually fail. Thus, the appropriate RTD must contain the maximum number of APEs matching the connection request APEs (see below for matching rules). This RTD guarantees to a certain extent that the path for the connection request's destination does not contain links that are tagged with NSC combinations that are being avoided by the connection request.

Rule (b): This rule eliminates any remaining RTD which cannot fully fulfill the connection request's policy requirements. As such, Rule (b) considers RPE mismatches, since they provide a way to determine whether there will be a full path to the destination that satisfies the connection request RPEs or not. Note that the number of RPE matches may not provide this guarantee. Applying rule (b), the appropriate RTD must contain a minimal number of RPEs mismatching with the connection request RPEs. This is essential so that the RTD policy guarantees to a certain extent that for the connection request's destination, there exists a pre-computed path that is formed fully based on links tagged with all the matching connection request RPEs. For example, consider a connection request that requests RPE1 and maps to an RTD with a policy that has RPE1 or RPE2. This RTD will use links tagged with RPE1 or RPE2 for path computations. For the connection request's destination, there might not exist a pre-computed path that consists fully of links tagged with RPE1, but perhaps a path with a mixture of links tagged with RPE1 or RPE2 which would satisfy the RTD policy but not the connection request's policy. If the connection request maps to an RTD with RPE1 only in its policy, this RTD should be selected over the previous one.

Rules (c) and (d): These rules compare paths of a policy-pruned network representation of an RTDs to the connection request's policy pruned network. The closer the representations, the better the match and the better the RTD. Note that RPE matches preferably are considered first since they typically provide a stronger indication (over APE mismatches) on the degree of closeness of the pruned network representations to the connection request. When applying rule (c), the appropriate RTD preferably contains the maximum number of RPEs matching with the connection request RPEs. Such an RTD provides a closer representation of the pruned network that the connection request policy requires. This requirement increases the likelihood of finding a path to the connection request's destination. It also ensures that the pre-computed path is the optimal path for the connection request given its policy restrictions. For example, consider a connection request that requests RPE1 or RPE2 and maps to an RTD with a policy that has RPE1 only. The RTD will only use links tagged with RPE1 for path computations. While the computed path satisfies the connection request policy, a path to the connection request's destination may not be found, or if found, it could be a sub-optimal path, and not properly load balanced throughout the pruned network due to neglecting links tagged with RPE2 during path computations.

Rules (e) and (f): These rules are used for tie-breaking if more than one RTD resulted from the filtering process using rules (a) to (d). If more than one RTD equally satisfy the above conditions, RTD tie-breaking rules can be applied to identify a single winner or a set of winners. Alternative tie-breaking mechanisms can select the RTD with the closer bandwidth match or the RTD with the numerically higher number.

After the appropriate RTD is selected, a check can be made on the pre-computed path to ensure that the path satisfies the connection request's policy (i.e. the path satisfies the matching RPEs, and no APEs are found in the path). In one embodiment, if the RTD contains no path that satisfies the connection request's policy, actual real-time computation is invoked. It is possible that due to RTD policy restrictions, no path is found to certain destinations.

In other embodiments, variations on the applications of the above noted rules can be applied, where some rules are not applied, where some collective rules are broken into their constituent rules and where some rules are combined with other rules. Also, the rules can be applied in different orders. Also, additional rules may be applied with any of the defined sets. For example, as a general set of rules, the RTDs that have the lowest number of RPEs that mismatch with the connection request RPEs would be selected first. Then from that set, the RTDs that have the highest number of RPEs with the closest match to the connection request RPEs are selected next. Finally, from that set, the RTD having the lowest number of APEs that mismatch with the connection request APEs is selected.

When considering matches between a connection request APE and an RTD APE, NSCs in the RTD APE should preferably be equal to or contained in the NSCs in the connection request APE. Note that the order of elements in an APE generally is insignificant. This indicates that the path computed using the RTD does not contain any of the NSCs that must be avoided by the connection request.

Table 5 provides some examples of matching and mismatching APEs.

TABLE 5

Matching RTD APEs to Connection request APEs

| RTD APE | Connection request APE | APE-APE Match (Y/N)? | Remarks |
|---------|------------------------|----------------------|---------|
| $(Ne_1)$ | $(Ne_1 \& Ne_2)$ | Yes | The RTD APE indicates that the pre-computed path contains no links that are tagged with $Ne_1$ meaning the |

TABLE 5-continued

Matching RTD APEs to Connection request APEs

| RTD APE | Connection request APE | APE-APE Match (Y/N)? | Remarks |
|---|---|---|---|
| ($Ne_3$) | ($Ne_1$) | No | combination $Ne_1$&$Ne_2$ will not be found in the path, which is acceptable for the connection request. While the RTD APE indicates that the pre-computed path does not contain links tagged with $Ne_3$, it does not guarantee that the path will not contain $Ne_1$. |
| ($Ne_1$& $Ne_2$) | ($Ne_1$&$Ne_2$) | Yes | Exact match |
| ($Ne_1$&$Ne_4$ &$Ne_2$) | ($Ne_1$&$Ne_2$) | No | The RTD APE indicates that the pre-computed path will not contain links tagged with the combination $Ne_1$&$Ne_4$&$Ne_2$. However, it is acceptable for the RTD policy to have links in the path that are tagged with $Ne_1$&$Ne_2$ which contradicts what the connection request requires. |

Similar to RPE matching, there are varying degrees of matches for APEs. For instance, in Table 5, between matches in rows 1 and 3, the entry in row 3 is a better match. The degree of matching between the connection request and RTD APEs is considered during selection of RTDs. For the embodiment, if a connection request does not contain any APEs and the RTD has no APEs (i.e. connection request/RTD policy has no must-avoid component), that is considered a match for the purpose of RTD selection.

For the second condition, the appropriate RTD should contain a minimal number of APEs that mismatch with the connection request APEs. As noted earlier, this helps to get a closer representation of the pruned network.

Examples 3, 4 and 5 illustrate the RTD selection process described above.

EXAMPLE 3

Consider a connection request with a policy defined as:

[require (logical_or {Ne-NSC__1}; logical_or {Rp-NSC__3, Rp-NSC__4}); must-avoid (logical_or {Ne-NSC 10, Ne-NSC__11})]

translates into:

RPE1: (Ne-NSC__1 & Rp-NSC__3) or

RPE2: (Ne-NSC__1 & Rp-NSC__4)

APE1: (Ne-NSC__10)

APE2: (Ne-NSC__11)

Table 6 shows all the RTDs to which the connection request maps and which RTD is selected.

TABLE 6

Matching a Policy for a Connection request against existing policies for RTDs

| RTD Policy | RTD Selected? | Remarks |
|---|---|---|
| RTD 2 [require (single {Ne-NSC__1}; logical_or {Rp-NSC__1, Rp-NSC__3, Rp-NSC__4})] which translates into: RPE1: (Ne-NSC__1 & Rp-NSC__1) RPE2: (Ne-NSC__1 & Rp-NSC__3) RPE3: (Ne-NSC__1 & Rp-NSC__4) | No | RPE2, RPE3 in RTD matches RPE1 and RPE2 in the connection request. Not selected. |
| RTD 3 [require (single {Ne-NSC__1};single {Rp-NSC__3}); must-avoid (logical_or {Ne-NSC__10, Ne-NSC__12})] which translates into: RPE1: (Ne-NSC__1 & Rp-NSC__3) APE1: (Ne-NSC__10) or APE2: (Ne-NSC__12) | Yes | RPE1 in RTD matches RPE1 and RPE2 in the connection request. Also, APE1 and APE2 match APE1 and APE2 of the connection request. RTD selected. |
| RTD 2 [require (single {Ne-NSC__1}; logical_or {Rp-NSC__3, Rp-NSC__4})]; must-avoid (single {Ne-NSC__12})] which translates into: RPE1: (Ne-NSC__1 & Rp-NSC__3) RPE2: (Ne-NSC__1 & Rp-NSC__4) APE1: Ne-NSC__12) | | RPE1 and RPE2 in RTD match RPE1, and RPE2 in the connection request. APE1 matches APE2 of the connection request. Not selected. |

While all RTDs map to the connection request, RTD 3 is the best fit for the connection request, according to the RTD selection rules defined above. Both RTD 3 and RTD 4 are better than RTD 1, since they provide more APE matches. APE matching is given higher priority since it provides more guarantee that the pre-computed path does not violate the connection request's policy. While RTD 4 provides more RPE matches than RTD 3, RTD 3 provides more guarantee (due to higher APE matches) that the pre-computed contains no APEs that connection requests are trying to avoid. Thus, RTD 3 is selected. RTD 4 becomes the next best choice, in the absence of RTD 3.

EXAMPLE 4

A connection request with a policy defined as:

[require (single (Ne-NSC__1); logical_or {Rp-NSC__1, Rp-NSC__2}); must-avoid (single (Ne-NSC__5})]

translates into:

RPE1: (Ne-NSC__1 & Rp-NSC__1) or

RPE2: (Ne-NSC__1 & Rp-NSC__2)

APE1: (Ne-NSC__5)

Table 7 shows all the RTDs that this connection request maps to, and which one is selected.

TABLE 7

Matching a Policy for a Connection request against existing policies for RTDs

| RTD Policy | RTD Selected? | Remarks |
|---|---|---|
| RTD 2<br>[require (single {Ne-NSC__1}; logical__or {Rp-NSC__1})];<br>must-avoid (single {Ne-Nsc__2})]<br>which translates into:<br>RPE1: (Ne-NSC__1 & Rp-NSC__1)<br>APE1: (Ne-NSC__2) | Yes | RPE1 in RTD matches RPE1 in connection request. |
| RTD 3<br>[require (single {Ne-NSC__1}; logical__or {Rp-NSC__1, Rp-NSC__3, Rp-NSC__4});<br>must-avoid (single {Ne-NSC__2})]<br>which translates into:<br>RPE1: (Ne-NSC__1 & Rp-NSC__1) or<br>RPE2: (Ne-NSC__1 & Rp-NSC__3) or<br>RPE3: (Ne-NSC__1 & Rp-NSC__4)<br>APE1: (Ne-NSC__2) | No | RPE in RTD matches RPE1 in connection request. |
| RTD 4<br>[require (single {Ne-NSC__1}; logical__or {Rp-NSC__1, Rp-NSC__2, Rp-NSC__3, Rp-NSC__4});<br>must-avoid (single {Ne-NSC__2})]<br>which translates into:<br>RPE1: (Ne-NSC__1 & Rp-NSC__1) or<br>RPE2: (Ne-NSC__1 & Rp-NSC__2) or<br>RPE3: (Ne-NSC__1 & Rp-NSC__3) or<br>RPE4: (Ne-NSC__1 & Rp-NSC__4)<br>APE1: (Ne-NSC__2) | No | RPE1 in RTD matches RPE1 in connection request. |

The connection request's policy maps to RTDs 2, 3 and 4, and APE1 of the connection request mismatches with APE1 of the RTD. RTD 2 was selected rather than RTD 4. Although the policy in RTD 4 has more matching RPEs than the one in RTD 2, the order of the selection resulted in the selection of RTD 2. RTD 2's policy guarantees that for the connection request's destination the path computed contains RPE1 only. While RTD 4's policy may have RPE1 and RPE2 in its path for the connection request's destination, it is not guaranteed that those RPEs are available on the whole path to the destination. That is, the path may alternatively contain the other RPEs (RPE3 or RPE4) in the policy and still satisfy the RTD policy, yet, it does not provide a continuous path that has the RPEs required by the connection request. Hence, selecting RTD 4 may result in failure in primary path computation which causes actual real-time path computation to be invoked. In the absence of RTD 2, RTD 4 becomes the next best choice. The same applies for the selection between RTD 2 and RTD 3.

EXAMPLE 5

A connection request with a policy defined as:

[require (logical_or {Ne-NSC__1}; logical_or {Rp-NSC__3, Rp-NSC__4})]

translates into:

RPE1: (Ne-NSC__1 & Rp-NSC__3) or

RPE2: (Ne-NSC__1 & Rp-NSC__4)

Table 8 shows all the RTDs that this connection request maps to, and which one is selected.

TABLE 8

Matching a Policy for a Connection request against existing policies for RTDs

| RTD Policy | RTD Selected? | Remarks |
|---|---|---|
| RTD 3<br>[require (single {Ne-NSC__1}; logical__or {Rp-NSC__1, Rp-NSC__3, Rp-NSC__4})];<br>must-avoid (single {Ne-NSC__2})]<br>which translates into:<br>RPE1: (Ne-NSC__1 & Rp-NSC__1) or<br>RPE2: (Ne-NSC__1 & Rp-NSC__3) or<br>RPE3: (Ne-NSC__1 & Rp-NSC__4)<br>APE1: (Ne-NSC__2) | Yes | RPE2, RPE3 in RTD matches RPE1 and RPE2 in connection request. RTD selected. |
| RTD 4<br>[require (logical__or {Ne-NSC__1, Ne-NSC__2}; logical__and {Rp-NSC__1, Rp-NSC__2, Rp-NSC__3, Rp-NSC__4});<br>must-avoid (single {Ne-NSC__2})]<br>which translates into:<br>RPE1: (Ne-NSC__1 & Rp-NSC__1 & Rp-NSC__2 & Rp__NSC__3 & Rp-NSC__4)<br>or<br>RPE2: (Ne-NSC__2 & Rp-NSC__1 & Rp-NSC__2 & Rp-NSC__3 & Rp-NSC__4)<br>APE1: (Ne-NSC__2) | No | RPE in RTD matches RPE1 and RPE2 in connection request. |

RTD 3 and RTD 4 map to the connection request's policy. Although both RTDs have similar number of RPEs that mismatch with the connection request RPEs (RPE1 for RTD 3 and RPE2 for RTD 4), and similar number of matching RPEs (see table), RTD 3 is still selected after considering how closely the RPEs match with the RPEs of the connection request. In this case, the RPEs in RTD 3 match more closely to the RPEs of the connection request compared to RPEs in RTD 4. RPE1 in RTD 4 has more NSCs that mismatch with the connection request's RPE1 and RPE2 NSCs.

It will be appreciated that in other embodiments, it may not be necessary to initially break down the elements of a connection request and to break down the elements of the RTDs to analyze the connection request requirements against the RTD elements. In such embodiments, it is possible to analyze the connection request requirements directly against the RTD elements; alternatively, it may be sufficient to break down either only the RTD elements or only the connection request requirements. In other embodiments, it may be sufficient to perform a partial break down of either the connection request requirements or the RTD elements and compare the results against other elements.

As well, other rules and techniques than those described herein by way of example may be employed to compare a connection's policy to a configured RTD policy. Those skilled in the art will understand that various other modifications of detail may be made to the present invention, all coming within its spirit and scope.

We claim:

1. A method for identifying a pre-computed path for an incoming connection at a node in a policy-based routing network, said method comprising:

distilling requirements of said incoming connection into one or more connection elements;

distilling policies associated with routes available from said node into must-avoid and policy elements;

identifying at least one policy of said policies which meets said requirements of said incoming connection by comparing said one or more connection elements to said one or more policy elements, wherein said identifying step further comprises the following sub-steps:

identifying, as a first set, routes that have a lowest number of required elements mismatching required elements of said incoming connection, from said first set, identifying, as a second set, routes that have a highest number of required elements matching required elements of said incoming connection, and from said second set, identifying, as said at least one policy, a route having a lowest number of must-avoid elements mismatching must-avoid elements of said incoming connection; and utilizing said at least one policy for said pre-computed path for said incoming connection.

2. The method for identifying a pre-computed path for an incoming connection, as claimed in claim 1, wherein said policy-based routing network is an Asynchronous Transfer Mode (ATM) network and said node is an ATM network device.

3. The method for identifying a pre-computed path for an incoming connection, as claimed in claim 2, wherein said policy-based routing network is based on Private Network-to-Network Interface (PNNI) protocols.

4. A system for identifying a pre-computed path for an incoming connection at a node in a policy-based routing network, said system comprising:

a first module to distill requirements of said incoming connection into one or more connection elements;

a second module to distill policies associated with routes available from said node into must-avoid and policy elements;

a third module to identify at least one policy of said policies which meets said requirements of said incoming connection by comparing said one or more connection elements to said one or more policy elements, wherein said third module:

identifies, as a first set, routes that have a lowest number of required elements mismatching required elements of said incoming connection, identifies, as a second set, routes from said first set that have a highest number of required elements matching required elements of said incoming connection, and identifies, as said at least one policy, a route from said second set having a lowest number of must-avoid elements mismatching must-avoid elements of said incoming connection; and a fourth module to set an egress route for said incoming connection utilizing said at least one policy for said pre-computed path.

5. The system for identifying a pre-computed path for an incoming connection, as claimed in claim 4, wherein said policy-based routing network is an Asynchronous Transfer Mode (ATM) network and said node is an ATM network device.

6. The system for identifying a pre-computed path for an incoming connection, as claimed in claim 5, wherein said policy-based routing network is based on Private Network-to-Network Interface (PNNI) protocols.

* * * * *